United States Patent [19]

Mitchell et al.

[11] Patent Number: 4,977,014
[45] Date of Patent: Dec. 11, 1990

[54] THERMOPLASTIC BLOCK COPOLYMER FILMS

[75] Inventors: Neil F. Mitchell, Santa Barbara, Calif.; Lie K. Djiauw, Houston, Tex.

[73] Assignee: Shell Oil Company, Houston, Tex.

[21] Appl. No.: 397,072

[22] Filed: Aug. 22, 1989

[51] Int. Cl.$^5$ .......................... C08J 5/18; C08L 53/02; C08L 31/04; C08L 25/06
[52] U.S. Cl. ..................................... 428/220; 525/93; 524/505
[58] Field of Search ........................... 525/93; 428/220

[56] References Cited

U.S. PATENT DOCUMENTS

| 3,980,736 | 9/1976 | Agouri et al. | 525/93 |
| 3,994,439 | 11/1976 | VanBreen et al. | 525/93 |
| 4,367,312 | 1/1983 | Bantinck et al. | 525/93 |
| 4,476,180 | 10/1984 | Wnuk | 428/220 |

FOREIGN PATENT DOCUMENTS

| 1902228 | 9/1969 | Fed. Rep. of Germany | 525/93 |
| 57-098544 | 6/1982 | Japan | 525/89 |
| 1341922 | 12/1973 | United Kingdom | 525/93 |

Primary Examiner—Carman J. Seccuro
Attorney, Agent, or Firm—Keith M. Tackett

[57] ABSTRACT

The properties of polymer films which contain thermoplastic block copolymer compositions and ethylene/vinyl acetate copolymers are improved by the addition of small amounts of polystyrene. Specific improvements have been made in elastically and tensile strength as well as in reduced die build-up during processing.

11 Claims, No Drawings

THERMOPLASTIC BLOCK COPOLYMER FILMS

BACKGROUND OF THE INVENTION

The invention relates to blends of thermoplastic block copolymers and ethylene/vinyl acetate copolymers. More specifically, the invention relates to films made from the blends.

U.S. Pat. No. 4,476,180 describes elastomeric films comprising from about 40% to about 80% of a thermoplastic block copolymer composition and from about 20% to about 60% of an ethylene/vinyl acetate copolymer. A polyolefin/silica blend is preferably added to the film compositions as anti-blocking agents. The '180 patent asserts that films having good tensile strength and good elasticity must contain ethylene/vinyl acetate copolymers that have a vinyl acetate content between 22% and 33% and have a melt index less than 0.6 as determined by ASTM Method D 1238, Condition B. The films are processed with conventional equipment although a problem with die build-up reduces productivity.

SUMMARY OF THE INVENTION

Polymer films containing thermoplastic block copolymers and ethylene/vinyl acetate (EVA) copolymers are improved by the addition of small amounts of polystyrene. The present invention is a polymer film having from about 40% to about 80% of a thermoplastic block copolymer composition, from about 15% to about 60% of an EVA, and 10 to 45 parts polystyrene per hundred parts of the thermoplastic block copolymer. The total film composition has a melt index less than 12 as determined by ASTM Method D 1238, Condition E. The EVA has a vinyl acetate content as low as 12% when polyolefins are not present.

DETAILED DESCRIPTION OF THE INVENTION

The present invention is an elastomeric polymer film having from about 40% to about 80% of a thermoplastic block copolymer composition, from about 15% to about 60% of an ethylene/vinyl acetate (EVA) copolymer, and 10 to 45 parts polystyrene per hundred parts of thermoplastic block copolymer. The total film composition has a melt index less than 12 as determined by ASTM Method D 1238, Condition E.

The thermoplastic block copolymer compositions employed in the film composition are blends of an oil and a termoplastic elastomer having at least two monoalkenylarene polymer blocks A and at least one unsaturated conjugated diene polymer block B. Linear triblock copolymers are preferred as described in U.S. Pat. No. 4,476,180 which specification is incorporated by reference herein. The perferred monoalkenylarene is styrene and the preferred conjugated diene is butadiene.

A most preferred block copolymer composition is KRATON ® D4150 block copolymer crumb which is sold by Shell Chemical Company in pellet form under the designation of KRATON ® D2104 block copolymer. These linear styrene-butadiene-styrene block copolymer compositions contain about one-third processing oil by weight to improve processability, and have a low melt index which assists in maintaining a low melt index for the film composition.

The thermoplastic block copolymer compositions are blended with an EVA copolymer as described in U.S. Pat. No. 4,476,180. For the present invention, the EVA may have a vinyl acetate content between 12% and 33% and maintain good elasticity. The addition of a polyolefin as a carrier for the anti-blocking agent as taught in the '180 patent effectively decreases the vinyl acetate content of the EVA. Ommision of the polyolefins allows the preparation of stable films from EVA having a lower vinyl acetate content. Moreover, the addition of polystyrene improves the elasticity of the film compositions such that EVA copolymers having a vinyl acetate content as low as 12% can be used to prepare elastic films. A vinyl acetate content between 15% and 20% is most preferred.

The melt index of the EVA can vary depending on the melt index of the other components such that the melt index of the film composition is less than 12 as determined by ASTM Method D 1238, Condition E. The melt index of the film composition correlates with the tensile strenght of the film. Thus, a lower melt index for the EVA is one method of obtaining high tensile strengths. An EVA with a melt index less than 3 (Condition B) will make stable films when blended with the KRATON ® D4150 block copolymer composition if polystyrene is present as described below.

Suitable EVA copolymers are commercially available from US Industrial Chemicals under the designation UE645 or UE634 (both 28% vinyl acetate), and from Exxon Chemical Company under the designation Elvax 250 (28% vinyl acetate) or Elvax 460 (18% vinyl acetate).

The present invention requires the addition of polystyrene in an amount from 10 to 45 parts per hundred parts of the thermoplastic block copolymer. The polystyrene effectively increases the elasticity of the block copolymer and reduces blocking. The polystyrene also improves melt processing of the film composition and eliminates die build-up experienced for similar films prepared without the polystyrene.

A preferred polystyrene is commercially avaiable from Huntsman Chemical Company under the designation DP-210. This general purpose polystyrene has a molecular weight distribution that is compatible with the KRATON ® D4150 block copolymer composition.

The film compositions of the present invention preferably include stabilizers, slip agents, and anti-blocking agents in an amount between 0.1 and 10 parts per hunderd parts of the block copolymer. The addition of polyolefin as an anti-blocking agent is not required.

The film composition of the present invention may be manufactured using polymer blending techniques currently practiced in the art, such as batch and continuous mixing methods employing mixing equipment like Banbury batch mixers, Farrell continuous mixers and twin-screw extruders. Well mixed compositions are obtainable when mixing is carried out at a melt temperature in the range between about 350° to about 395° F. Fims blown with inadequately mixed compositions usually would show a high intensity of gels or a fish eye appearance as well as a tendency to block.

Extrusion blown films may be prepared from the compositions of this invention using standard equipment, standard techniques and typical conditions. A polyolefin type extruder screw is preferred, but other designs are also acceptable. A die gap of about 5 to about 120 mils is acceptable, a gap of about 10 to about 80 mils is preferred, and a gap of about 20 to about 40 mils is most preferred. Melt temperatures of about 340° F. to about 400° F. are acceptable and between about 350° F. and 375° F. are preferred. A blow up ratio of 2 to 1 is preferred. Rapid cooling of the extruder blown film is preferably performed by a dual lip cooling ring. Due to the low modulus of the film produced from the composition of this invention, a rollered collapsing frame is preferred to avoid bubble chatter.

A film which is extrusion blown from the composition of this invention is between about 0.5 and 10 mils in thickness, and is preferably between about 1 and about 6 mils in thichness and is most preferably between about 1 and 4 mils in thickness.

A 2 mil film can be extrusion blown from the composition of the present invention using a 2½ inch extruder with a 10 inch diameter die and a 0.030 inch die gap and 20/80/200/80/20 screens. The extrusion can be at a pressure of 2800 psi and at the rate of 70 fpm. A screw speed of 30 rpm, a melt temperature of 370° F., and a blow up ratio of 1.8 to 1 are acceptable.

The composition of this invention may be extruder blown to a film with excellent tensile strength and high ultimate elongation in both machine and transverse directions, high blow out ratios, low permanent set and high recoverable energy. Films having 100% modulus of less than about 450 psi in both the machine and transverse directions are obtainable. Films made from the composition of this invention have recoverable energy of greater than about 70 and permanent sets of about 25 and less.

EXAMPLES

The following examples illustrate preferred embodiments of the invention in comparison to similar compositions which do not contain polystyrene. All experiments were conducted with KRATON ® D4150 block copolymer composition which was blended with several different EVA copolymers. The polystyrene employed in the following examples was DP-210 in an amount of 21 phr based on the amount of thermoplastic block copolymer present in the thermoplastic block copolymer composition.

The additive package employed in the following examples comprised, based on the block copolymer content, 0.45 phr Irganox 1010 stabilizer sold by Ciba Geigy Corp., 2.25 phr each of Armoslip CP and Armoslip 18 slip agents sold by AKZO Chemicals, Inc., and 6.9 hpr Superfloss silica anti-blocking agent sold by Manville Corp.

The melt index of the film compositions or components was determined according to ASTM Method D-1238, condition B or E as indicated. The ultimate tensile strength and elongation were determined according to ASTM D-882-81 method using an Instron Model 1122 tester. The tensile properties of the film were measured in the direction of extrusion of the film (machine direction, MD) and in the direction perpendicular to the direction of extrusion (transverse direction, TD).

To determine permanent set, a specimen was prepared according to ASTM D-882-81. Test specimens were cut along the direction of extrusion of the film (MD). An Instron Model 1122 tester was used to subject the specimens to maximum extension of 15% strain and then relaxation at the same rate as the extension until the specimen was in the relaxed state (near zero force). Subsequently another loading cycle was imposed. The lenght at which the specimen reaches its relaxed state in the unloading cycle was measured and the permanent set was then calculated according to the following equation:

$$\text{Permanent set} = 100\% \times \frac{(\text{length at relaxed state} - \text{original length})}{(\text{length at max extension} - \text{original length})}$$

The recoverable energy is the ratio of the energy released during the unloading cycle to the energy stored during the loading cycle.

The blow-out ratio of blown films is calculated as the ratio of the total lay flat width of the blown film to the circumference of the inner circle of the film die.

Example 1

A polymer film was prepared from a blend of 150 parts of the thermoplastic block copolymer composition (about 100 parts block copolymer and 50 parts oil) and 45 parts of UE645 EVA copolymer. Polystyrene and the additive package were included as indicated in the Table below. All ingredients were blended with a twin-screw extruder (diameter=0.8 inch, screw length/diameter ratio, L/d, =20:1). The films were obtained by blown film process using a 0.75 inch diameter single screw Brabender extruder equipped with a 2 inch diameter film die and 0.020 inch die gap at about 500–800 psi. Other process conditions are listed in the Table below.

The polymer film had excellant tensile strength and elasticity and no die build-up was observed.

EXAMPLE 2 (Comparision)

A polymer film was prepared as described in Example 1 without the addition of the polystyrene. The film has reduced tensile strength and elasticity in comparison to the film of Example 1. A trace of die buid-up was observed as indicated in the Table below.

EXAMPLE 3

A polymer film was prepared as described in Example 1 except for replacement of the low melt index UE645 EVA with the higher melt index UE634 EVA. Other changes in process condition are shown in the Table below. The polymer film had good tensile strength and improved elasticity without evidence of die build-up as shwon in the Table.

EXAMPLE 4

A polymer film was prepared as described in Example 1 except for replacement of the low melt index UE645 EVA with the higher melt index Elvax250 EVA. Other changes in process condition are shown in the Table below. The polymer film had acceptable tensile strength and excellant elasticity without evidence of die build-up as shwon in the Table.

EXAMPLE 5 (Comparison)

A polymer film was prepared as described in Example 4 without the addition of the polystyrene. The film has reduced tensile strength and elasticity in comparison to the film of Exmaple 4. Moderate die build-up and poor bubble stability were observed as indicated in the Table.

EXAMPLE 6 (Comparison)

A polymer film was prepared as described in Example 1 except for replacement of the low melt index UE645 EVA with the much higher melt index Elvax240 EVA. Other changes in process condition are shown in the Table below. The polymer film had reduced tensile strength and good elasticity in comparison to Example 1. Moderate die build-up and poor bubble stability were observed as shown in the Table.

EXAMPLE 7

A polymer film was prepared as described in Example 1 except for replacement of the UE645 EVA with Elvax460 which has both a reduced melt index and a reduced vinyl acetate content as shown in the Table. The polymer film had good tensile strength and elasticity without evidence of die build-up as shown in the Table.

TABLE

|  | Examples | | | | | | |
|---|---|---|---|---|---|---|---|
|  | 1 | 2 | 3 | 4 | 5 | 6 | 7 |
| Ingredients, wt % | | | | | | | |
| Thermoplastic composition | 65.8 | 72.5 | 65.8 | 65.8 | 72.5 | 65.8 | 65.8 |
| Polystyrene | 9.2 | 0.0 | 9.2 | 9.2 | 0.0 | 9.2 | 9.2 |
| Additives | 5.2 | 5.7 | 5.2 | 5.2 | 5.7 | 5.2 | 5.2 |
| EVA Resin | | | | | | | |
| UE645 (28% VA) | 19.7 | 21.8 | | | | | |
| UE634 (28% VA) | | | 19.7 | | | | |
| Elvax250 (28% VA) | | | | 19.7 | 21.8 | | |
| Elvax240 (28% VA) | | | | | | 19.7 | |
| Elvax460 (18% VA) | | | | | | | 19.7 |
| Total Composition | 100.0 | 100.0 | 100.0 | 100.0 | 100.0 | 100.0 | 100.0 |
| MI of EVA, Cond B. | 0.3 | 0.3 | 0.6 | 2.65 | 2.65 | 5.6 | 0.16 |
| Cond E | 1 | 1 | 2.5 | 22 | 22 | 45 | 2 |
| Blown films | | | | | | | |
| Screw RPM | 90 | 90 | 86 | 86 | 98 | 82 | 82 |
| Melt temp, °F. | 380 | 380 | 380 | 400 | 380 | 380 | 340 |
| Die Build-up | no | trace | no | no | mod | mod | no |
| Bubble stability | good | good | good | good | poor | poor | good |
| Lay-flat width, in. | 6.5 | 6.75 | 6.75 | 6.75 | 5.5 | 4.25 | 5.25 |
| Thickness, mils | 2 | 3 | 3 | 3 | 4 | 7 | 4 |
| BUR | 2.1 | 2.1 | 2.1 | 2.1 | 1.8 | 1.4 | 1.7 |
| Draw-down | 4.2 | 2.7 | 2.7 | 2.7 | 2.5 | 1.8 | 2.6 |
| Physical Properties | | | | | | | |
| MI of film, Cond E | 5.5 | 6.9 | 8.2 | 11.4 | 14.2 | 14.1 | 5.4 |
| Tensile Strength, psi | | | | | | | |
| MD | 1520 | 1360 | 1110 | 850 | 810 | 810 | 1280 |
| TD | 1290 | 1020 | 860 | 570 | 500 | 490 | 1100 |
| Ultimate elong., % | | | | | | | |
| MD | 920 | 990 | 920 | 870 | 1160 | 883 | 855 |
| TD | 960 | 950 | 930 | 790 | 1010 | 830 | 920 |
| Permanent set, % | | | | | | | |
| MD | 17 | 19 | 15 | 14 | 17 | 16 | 20 |
| TD | 18 | 20 | 18 | 15 | 15 | 13 | 20 |
| Blocking | no | no | no | no | no | no | no |

The examples support an inverse correlation between melt index of the film compositions and tensile strength. Moreover, comparison of Example 1 to Example 2 and Example 4 to Example 5 establishes that the addition of polystyrene improves the tensile strength and elasticity of the films. Comparison of Example 7 to Example 2 further establishes that EVA's having a low vinyl acetate content make comparable films to EVA's having a having vinyl acetate content when polystyrene is blended with the former.

What is claimed is:

1. A polymer film having a thickness of between about 0.5 mils and 10 mils, made from a polymer blend composition having a melt index of less than 12 as determined by ASTM method 1238, condition E comprising:
    about 40% to about 80% of a thermoplastic block copolymer of a monoalkenylarene and an unsaturated butadiene, containing up to about one-third porocessing oil by weight;
    about 15% to about 40% of an ethylene/vinyl acetate copolymer having a vinyl acetate content between 12% and 33%; and
    10 to 45 parts polystyrene per hundred parts of the block copolymer.

2. The polymer film of claim 1, wherein the thermoplastic block copolymer is a blend of a polystyrene-butadiene-polystyrene block copolymer and an oil.

3. The polymer film of claim 2, wherein the thermoplastic block copolymer is KRATON® D4150 or KRATON® D2104 block copolymer composition.

4. The polymer film of claim 3, wherein the ethylene/vinyl acetate copolymer has a melt index less than 3 as determined by ASTM Method D 1238, Condition B.

5. The polymer film of claim 4, wherein the vinyl acetate content is 15–20%.

6. A polymer film having a thickness of between about 0.5 mils and 10 mils, comprising:
    about 65% of KRATON® D4150 or KRATON® D2104 block copolymer
    about 20% of an ehtylene/vinyl acetate copolymer having a vinyl acetate content of 15–20%; and
    about 10% of polystyrene;
    the film composition having a melt index less than 12 as determined by ASTM Method D 1238, Condition E.

7. The polymer film of claim 6, wherein the melt index of the film composition is less than 6.

8. The polymer film of claim 1 wherein the thickness is between about 1 mil and about 6 mils.

9. The polymer film of claim 1 wherein the thickness is between about 1 mil and 4 mils.

10. The polymer film of claim 6 wherein the thickness is between about 1 mil and about 6 mils.

11. The polymer film of claim 6 wherein the thickness is between about 1 mil and 4 mils.

* * * * *